United States Patent [19]

Moore

[11] Patent Number: 5,123,516
[45] Date of Patent: Jun. 23, 1992

[54] ARTICLE CONVEYING AND ORIENTING APPARATUS

[75] Inventor: Michael G. Moore, Louisville, Ky.

[73] Assignee: Carrier Vibrating Equipment, Inc., Louisville, Ky.

[21] Appl. No.: 657,137

[22] Filed: Feb. 15, 1991

[51] Int. Cl.[5] .......................................... B65G 47/14
[52] U.S. Cl. .................................. 198/396; 198/446
[58] Field of Search .................. 198/396, 446, 445; 209/542, 674

[56] References Cited

U.S. PATENT DOCUMENTS

| | | | |
|---|---|---|---|
| 1,495,610 | 5/1924 | Paridon | 198/446 |
| 2,186,652 | 1/1940 | Orth et al. | 198/396 X |
| 2,324,246 | 7/1943 | Thompson et al. | 198/446 |
| 2,456,031 | 12/1948 | Spain | 198/446 |
| 3,084,782 | 4/1963 | Bower | 198/396 X |
| 3,365,047 | 1/1968 | Schmitz | 198/396 X |

OTHER PUBLICATIONS

Carrier Vibrating Equipment, Inc., "Unique Materials--Handling with Vibration", pp. 1-34, 1984.
Carrier Vibrating Equipment, Inc., "Vibrating Feeders", pp. 1-16, date unknown.

Primary Examiner—Robert P. Olszewski
Assistant Examiner—Cheryl L. Gastineau
Attorney, Agent, or Firm—Barnes & Thornburg

[57] ABSTRACT

A vibratory conveyor apparatus is provided for conveying and orienting articles. The apparatus includes a hopper having an inlet and an outlet. The hopper is vibrated to convey articles in the hopper in a predetermined direction from the inlet toward the outlet. The apparatus also includes a plurality of lane dividers for dividing the hopper into a plurality of article-receiving lanes arranged to conduct articles disposed therein toward the outlet. The apparatus further includes barriers coupled to the lane dividers for disengaging an article riding on the lane dividers as the article is conveyed in the predetermined direction to cause the article to fall into a single article-receiving lane and assume a predetermined orientation therein prior to discharge of the article from the hopper through the outlet.

17 Claims, 2 Drawing Sheets

ARTICLE CONVEYING AND ORIENTING APPARATUS

BACKGROUND AND SUMMARY OF THE INVENTION

This invention relates to assemblies for transporting articles, and, in particular to vibratory conveyors for moving articles from one location to another. More particularly, the invention relates to an apparatus for orienting a plurality of randomly positioned articles into a predetermined orientation as the articles are transported in a predetermined direction through the apparatus.

Various types of vibratory conveyors are known for transporting articles having many different shapes and sizes. These vibratory conveyors are often used to move articles from one location to another along an assembly line. Vibratory conveyors are also used to transport articles to a remote location for packaging.

the present invention is designed to receive a load of randomly positioned articles or a random continuous flow of articles having a predetermined shape and orient the articles into a predetermined orientation as the articles are being transported through the apparatus. This automatic sorting and orienting feature advantageously automates packaging of the articles as the oriented articles exit the apparatus.

The present invention is designed to eliminate the need for manually sorting, orienting, or positioning articles onto conveyor belts or loading chutes. By automating the orienting and sorting of the articles, the present invention advantageously reduces manpower requirements, permits continuous downstream processing, and increases the production capabilites of packaging systems.

According to one aspect of the present invention, a vibratory conveyor apparatus is provided for conveying and orienting articles. The apparatus includes a hopper having an inlet and an outlet, and means for vibrating the hopper to convey articles in the hopper in a predetermined direction from the inlet toward the outlet. The apparatus also includes means for dividing the hopper into a plurality of article-receiving lanes arranged to conduct articles disposed therein toward the outlet. The apparatus further includes means for disengaging an article riding on the dividing means as the article is conveyed in the predetermined direction to cause the article to fall into a single article-receiving lane and assume a predetermined orientation therein prior to discharge of the article from the hopper through the outlet.

In the illustrated embodiment, the dividing means includes a plurality of upstanding lane dividers coupled to the hopper and arranged in spaced apart relation to define a plurality of article-receiving lanes in the hopper. The disengaging means is mounted on at least one of the lane dividers. The disengaging means includes a barrier having a ramp and means for mounting the barrier on the lane divider so that the ramp is inclined to slope upwardly in the predetermined direction to receive a portion of an article riding on the lane divider and retard movement of said portion in the predetermined direction as the article is conveyed further toward the outlet causing said portion to disengage the lane divider and fall into the article-receiving lane.

The mounting means includes means for selectively adjusting the angle of incline of the ramp with respect to the lane divider so that a gently sloping ramp is provided to minimize the movement-retarding capacity of the barrier for certain articles and a steeply sloping ramp is provided to maximize the movement-retarding capacity for other articles. Illustratively, the slope of the ramp can be increased using the adjusting means as the weight of the articles increases. The ramp of the barrier establishes an article-camming inclined plane sloping upwardly in the predetermined direction toward the outlet. Advantageously, the ramp provides means for camming a portion of the article riding on the lane divider to rotate the article and deposit the article, disengage the article from the lane divider, and deposit in a single article-receiving lane.

The article-receiving lanes are configured so that the articles can fall into the lanes only in a single predetermined orientation. Therefore, the camming means causes the articles to be oriented in the predetermined orientation prior to discharge of the articles through the outlet of the hopper.

Also in the illustrated embodiment, a bin is coupled to the inlet of the hopper for receiving a plurality of randomly positioned articles therein. The bin is coupled to the vibrating means alongside the hopper to convey articles in the bin toward the inlet of the hopper. The apparatus also includes means for unstacking articles being conveyed toward the inlet of the hopper in the bin so that articles are arranged a single layer deep as they enter the inlet of the hopper. The bin includes a transporting surface which is able to be adjusted to an inclined position, a declined position, or a horizontal position to transport articles from the bin to the inlet of the hopper and the unstacking means includes a striker plate positioned over the inclined surface to permit only a single layer of articles to enter the inlet of the hopper.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
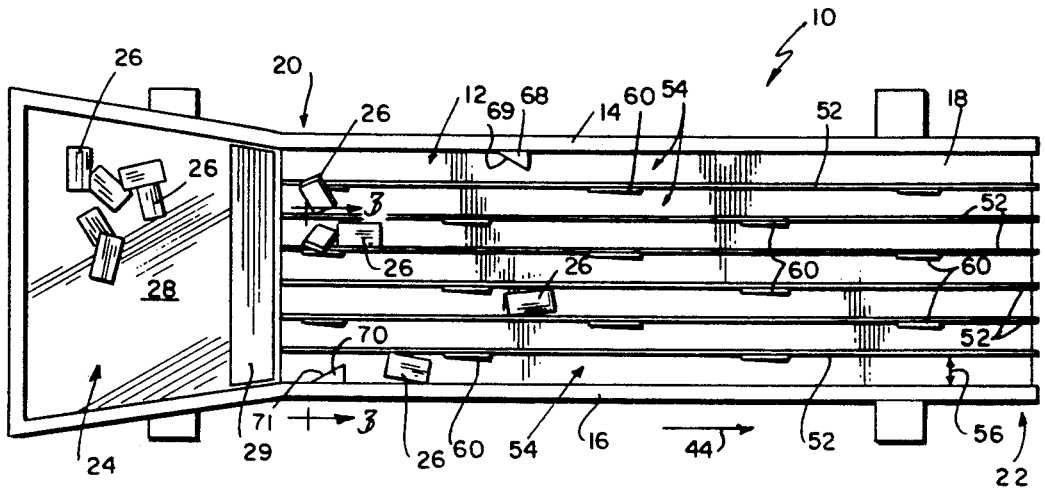
FIG. 1 is a top plan view of the vibratory conveyor apparatus of the present invention illustrating a hopper including a plurality of lane dividers defining a plurality of article-receiving lanes, a load bin for receiving randomly positioned articles, and means coupled to the lane dividers for disengaging the articles from the lane dividers as the articles move through the hopper to orient the articles in a predetermined orientation.
Figure 2:
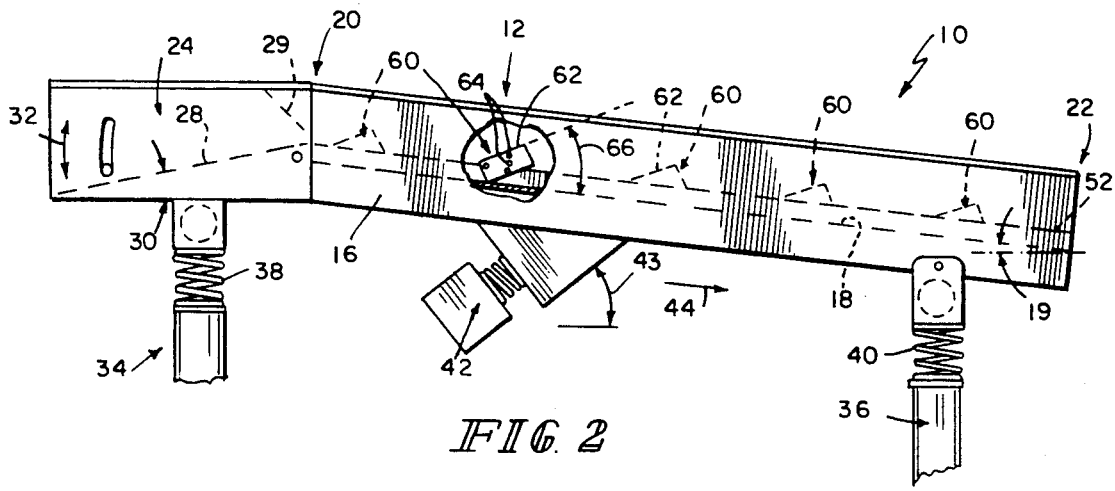
FIG. 2 is a side elevational view of the apparatus of FIG. 1, with portions broken away, illustrating the relative positions of the hopper floor, the lane dividers, and a plurality of barriers providing inclined article-camming ramps.
Figure 3:
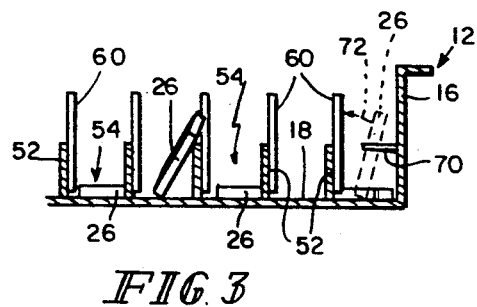
FIG. 3 is a sectional view taken along lines 3—3 of FIG,. 1 further illustrating the orientation of the barriers and the lane dividers relative to the floor of the hopper.

Referring now to the drawings, FIGS. 1-3 illustrate an assembly 10 in accordance with the present invention for orienting randomly positioned articles and transporting the articles to a remote location. The assembly 10 is best illustrated in FIGS. 1 and 2. The assembly 10 includes a trough or hopper 12 having a first side wall 14, a second side wall 16, and a floor 18 extending between the first and second side walls 14 and 16. Side walls 14 and 16 define a width boundary of the hopper 12. Hopper 12 includes a load inlet end 20 and a discharge outlet end 22.

A bin 24 is coupled to the inlet end 20 of hopper 12 for supplying articles 26 to hopper 12. Bin 24 includes an adjustable load plate or floor 28 positioned at a predetermined angle relative to the horizontal as illustrated by angle 30. The angle of floor 28 is adjustable in the direction of double-headed arrow 32 to change the rate that the articles 26 move toward hopper 12. The angle 30 is adjusted so that a single layer of articles 26 arranged in a random formation enter inlet 20 of hopper 12.

A striker plate 29 is positioned over the inclined floor 28 to unstack all articles 26 conveyed through the bin 24 before the articles 26 reach the hopper inlet 20. The distance between the bottom edge of the striker plate 29 and the underlying floor 28 is selected to permit only one article 26 to pass therebetween and reach the hopper inlet 20. This distance is adjustable. This distance is preferably equal to the depth 48 of article 26 plus operational clearances. All articles 26 stacked on top of an article 26 conveyed along floor 28 will be pushed away by striker plate 29 so that only a single layer of articles 26 will be permitted to enter inlet 20 of hopper 12.

Support posts 34 and 36 are coupled to opposite ends of the assembly 10. Support post 34 includes one spring member 38 and support post 36 includes another spring member 40. A drive force generator illustrated diagrammatically at location 42 is used to vibrate the assembly 10 to move the articles 26 from the bin 24 to the load inlet 20 of hopper 12 and through hopper 12 in the predetermined direction illustrated by arrow 44 toward the discharge outlet 22. The drive force generator 42 may illustratively include a natural frequency generator, a brute force generator, an electomagnetic generator, or other suitable means for vibrating the assembly 10. Illustratively, such drive force generators are available from Carrier Vibrating Equipment, Inc. of Louisville, Ky., the assignee of the present invention.

Figure 4:
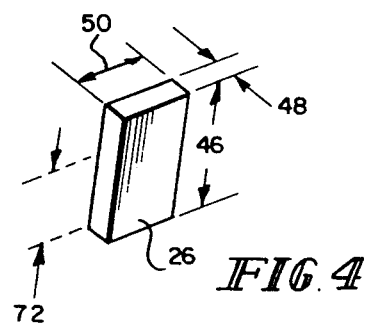
FIG. 4 is a perspective view of an illustrative sample of an article which can be conveyed and oriented by the assembly illustrated in FIGS. 1-3.

A typical article 26 which is oriented and conveyed by the assembly 10 is illustrated in FIG. 4. The article has a predetermined height illustrated by dimension 46, a predetermined depth illustrated by dimension 48, and a predetermined width illustrated by dimension 50. It is understood that the article 26 may be a rigid article or a semi-rigid article such as a foil packet or container filled with a product or a plastic enclosure. In the illustrated embodiment, the height of article 26 is greater than the width 50 and the width 50 is greater than the depth 48.

A plurality of randomly positioned articles 26 are loaded into bin 24. The vibrating inclined floor 28 of bin 24 transports the articles 26 toward inlet 20 of hopper 12. The angle 30 of floor 28 is adjustable to change the speed that articles 26 are conveyed in bin 24 so that only a single layer of articles is discharged from load plate 28 into hopper inlet 20. Striker plate 29 is provided for unstacking articles 26 being conveyed toward the inlet 20 of hopper 12 from bin 24 so that articles 26 are arranged in a random formation a single layer deep as they enter hopper inlet 20 to limit the articles 26 to a single layer.

A single layer of articles is desirable to allow the articles 26 to enter the article-receiving lanes 54 without having one article 26 stacked on top of another article 26. Such a stacking of articles 26 in the lanes 54 could reduce the effectiveness of the barriers 60 in orienting the articles. In addition, it is desirable to discharge articles 26 from outlet 22 in a single layer and in the predetermined orientation.

The assembly 10 orients articles 26 moving through hopper 12 so that the articles 26 assume a predetermined orientation prior to discharge from outlet 22. As best illustrated in FIG. 1, a plurality of upstanding lane dividers 52 are appended to the floor 18 of hopper 12 to divide the hopper 12 into a plurality of article-receiving lanes 54. In the illustrated embodiment in FIG. 1, there are six lane dividers 52 which divide hopper 12 into seven article-receiving lanes 54. It is understood that any number of lane dividers 52 could be used. The width of lanes 54, illustrated by dimension 56, is greater than the width 50 of articles 26 to permit the articles 26 to be conveyed through the lanes 54. However, the width 56 of lanes 54 is less than the height 46 of articles 26. Therefore, the articles 26 can be conveyed within the lanes 54 only in a single orientation once the article 26 falls into a single lane 54 as illustrated in FIG. 1.

Figures 5A, 5B, 5C:
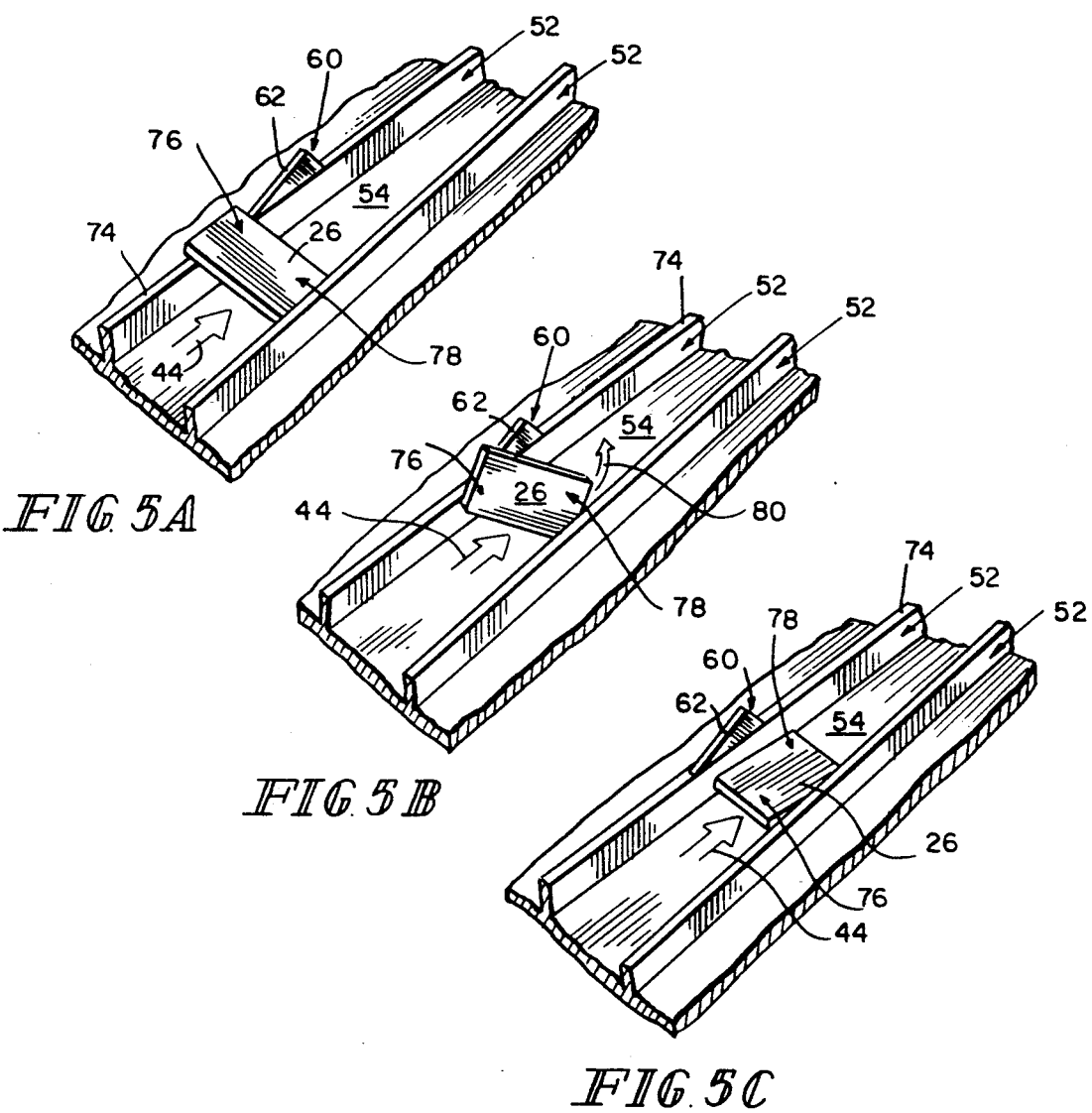
FIGS. 5A-5C show a perspective view of a portion of the hopper to illustrate sequential movement of an article rides on a lane divider as the article is conveyed through the hopper, engages the ramp surface of the barrier, and is finally rotated and deposited into an article-receiving lane to assume a predetermined orientation.

If the articles 26 are positioned so that the height dimension 46 is perpendicular to the lane dividers 52, then the articles 26 ride on one of the lane dividers 52 as best illustrated in FIG. 3 and FIG. 5A. A plurality of barriers 60 are coupled to lane dividers 52 at spaced apart intervals. The barriers 60 include a ramp 62 inclined to slope upwardly in the predetermined direction 44. The ramps 62 are angled at angle 66 illustrated in FIG. 2. The ramps 62 engage a top portion of the articles 26 as the articles are conveyed in the direction of arrow 44. The ramps 62 retard movement of the top portion of the articles 26 while the remainder of the articles 26 is conveyed further in the direction of arrow 44. Therefore, the ramps 62 turn the articles 26 riding on lane dividers 52 to disengage said articles 26 from the lane divider 52. After the article 26 is rotated, the height dimension of the disengaged article 26 is parallel to the lane dividers 52 and the article 26 falls into the article-receiving lanes 54 in the predetermined orientation. Movement of the articles 26 riding on dividers 52 is described below further with reference to FIGS. 5A-5C.

the illustrated embodiment of FIG. 1 includes five sets of barriers 60 positioned at spaced apart intervals in hopper 12. Each set includes three barriers 60 coupled to every other lane divider 52. Adjacent sets of barriers are coupled to different lane dividers 52 so that all the lane dividers include attached barriers 60. Staggering the barriers 60 at various locations helps to cause the articles 26 to be oriented in the predetermined orientation by the time the articles reach discharge outlet 22 of hopper 12.

As illustrated in FIG. 2, barriers 60 are adjustable relative to the floor 18 of hopper 12 to change the angle of incline 66 of ramps 62. Illustratively, barrier 60 includes a plurality of apertures 64 so that the angle can be adjusted. A fastener (not shown) extends through a selected aperture 64 to couple the barriers 60 to lane dividers 52. Ramps 62 are aligned at an acute angle 66 relative to floor 18 of hopper 12. The acute angle is illustrated by angle 66 in FIG. 2.

In the embodiment illustrated in FIG. 2, three slope settings are available for ramp 62. Three apertures for mounting the barrier 66 to the lane divider 52. Therefore, the ramp 62 is adjustable so that a gently sloping ramp is provided to minimize the movement-retarding capacity of the barrier 60 for certain articles and a steeply sloping ramp is provided to maximize the movement-retarding capacity of the barrier 60 for other articles.

Hopper 12 also includes blocking member 68 and 70 coupled to side walls 14 and 16 of hopper 12, respectively. Blocking members 68 and 70 are used to move articles 26 away from side walls 14 and 16. Blocking members 68 and 70 include ramps 69 and 71, respectively, sloped positively relative to first and second side walls 14 and 16 in the predetermined direction 44. Blocking members 68 and 70 provide means for changing the position of article 26 leaning against side walls 14 and 16, respectively, to move articles 26 away from side walls 14 and 16 so that the articles ride on the lane dividers 52 adjacent to the side walls 14 and 16. As illustrated in FIG. 3, if an article 26 is leaning against side wall 16, the barrier 60 would not engage the articles 26 as the articles move in predetermined direction 44. Therefore, blocking member 70 is provided to move the article 26 in direction of arrow 72 so taht the article 26 rides on lane divider 52 adjacent side wall 16. When the article 26 rides on lane divider 52, the article 26 engages barrier 60 and is automatically deposited into the lane 54 adjacent side wall 16 and oriented in a predetermined orientation therein.

In operation, a randomly positioned single layer of articles 26 enters inlet 20. The floor 18 of hopper 12 is aligned to have a negative slope in the predetermined direction as illustrated by angle 19. Floor 18 could also be aligned to have a positive slope or floor 18 could be parallel to the floor 28 of bin 24. The declined angle of floor 18 of hopper 12 combines with the barriers 60 on lane dividers 52 to provide a sufficient frictional force to slow or stop a top portion 76 of each article 26 while the bottom portion 78 continues to be conveyed in the predetermined direction 44. This causes the articles 26 to turn, disengage the lane divider 52, and fall into the article-receiving lanes 54. Illustratively, lane dividers 52 have a height so that the dividers 52 extend above floor 18 by a distance equal to approximately 60% of the height 46 of article 26. The height of lane dividers 52 compared to article 26 is illustrated by dimension 72 shown in FIG. 4. The height of lane dividers 52 may be altered depending upon the size, shape, or weight of articles 26 being conveyed.

Hopper 18 is vibrated by drive force generator 42 so that the articles 26 move in the direction of arrow 44 at a predetermined speed. While some articles 26 fall into the proper orientation inside lanes 54, other articles fall into hopper 12 and ride on lane dividers 52. The assembly 10 orients the articles 26 riding on the lane dividers 52 as the articles 26 are conveyed in direction of arrow 44 toward the outlet 22.

Sequential movement of an article 26 as it is oriented by the present invention is illustrated in FIGS. 5A–5C. FIG. 5A illustrates an article 26 riding on a top edge 74 of lane divider 52 inside article-receiving lane 54 as it is conveyed toward hopper discharge outlet 22 by vibration generated by drive force generator 42. As article 26 moves in direction 44, a top portion 76 of article 26 engages ramp 62 of barrier 60 which is coupled to lane divider 52. Ramp 62 retards movement of the top portion 76 of article 26 as the bottom portion 78 of article 26 continues to eb conveyed in the direction of arrow 44. By retarding movement of top portion 76, ramp 62 causes articles 26 effectively to rotate as illustrated by arrow 80 in FIG. 5B. In other words, the bottom portion 78 of article 26 advances relatively faster in the direction of arrow 44 in article-receiving lane 54 than does the top portion 76 of article 26.

The rotation of article 26 caused by ramp 62 is illustrated in FIG. 5B. As article 26 continues to rotate in the direction of arrow 80, ramp 62 causes the top portion 76 of article 26 to disengage top edge 74 of lane divider 52 so that the article 26 falls into the lane 54 between adjacent lane dividers 52. Once inside the lane 54, article 26 is aligned in the desired predetermined orientation because of the spacing between the adjacent lane dividers 52 defining side boundaries of lane 54. The ramp 62 provides an article-camming inclined plane sloping upwardly in the predetermined direction 44 toward the outlet as illustrated by angle 66. As discussed above, the coupling means 64 is adjustable for varying the upper slope of the ramp 62.

The present invention advantageously permits a random configuration of articles 26 to be deposited in bin 24. The assembly 10 automatically orients and unscrambles the articles 26 and positions the articles 26 into separate article-receiving lanes 54. Articles 26 are discharged from the discharge outlet 22 of hopper 22 for final packaging or additional processing.

Although the invention has been described in detail with reference to a certain preferred embodiment, variations and modifications exist within the scope and spirit of the invention as described and defined in the following claims.

What is claimed is:

1. A vibratory conveyor apparatus for conveying and orienting articles, the apparatus comprising a hopper having an inlet and an outlet, means for vibrating the hopper to convey articles in the hopper in a predetermined direction from the inlet toward the outlet, means for dividing the hopper into a plurality of article-receiving lanes arranged to conduct articles disposed therein toward the outlet, the dividing means including a plurality of upstanding lane dividers coupled to the hopper and arranged in spaced apart relation to define the plurality of article-receiving lanes, and means for disengaging an article riding on the dividing means from the dividing means as the article is conveyed in the predetermined direction to cause the article to fall into a single article-receiving lane and assume a predetermined orientation therein prior to discharge of the article from the hopper through the outlet, the disengaging means including a barrier having a ramp and means for mounting the barrier on a lane divider so that the ramp is inclined to slope upwardly in the predetermined direction to receive a portion of an article riding on the lane divider and retard movement of said portion in the predetermined direction as the article is conveyed further toward the outlet causing said portion to disengage the lane divider and fall in the article-receiving lane, the mounting means including means for selectively adjusting the angle of incline of the ramp with respect to the lane divider so that a gently sloping ramp is provided to minimize the movement-retarding capacity of the barrier for certain articles and a steeply sloping ramp is provided to maximize the movement-retarding capacity of the barrier for other articles.

2. The apparatus of claim 1, wherein the hopper includes a floor, the lane dividers are mounted on the floor, and the ramp of the barrier is inclined at an acute angle with respect to the floor.

3. The apparatus of claim 1, further comprising a bin coupled to the inlet of the hopper for receiving a plurality of randomly positioned articles therein, means for coupling the bin to the vibrating means so that articles deposited in the bin are conveyed to the inlet of the hopper, and means for unstacking articles being conveyed toward the inlet of the hopper in the bin so that articles are arranged in a random formation a single layer deep as they enter the inlet of the hopper.

4. The apparatus of claim 3, wherein the bin includes a transporting surface for transporting articles from the bin to the inlet of the hopper and the unstacking means includes a striker plate positioned over the transporting surface to permit only a single layer of articles to enter the inlet of the hopper.

5. A vibratory conveyor apparatus for conveying and orienting articles, the apparatus comprising
a hopper having an inlet and an outlet,
means for vibrating the hopper to convey articles in the hopper in a predetermined direction from the inlet toward the outlet,
means for dividing the hopper into plurality of article-receiving lanes arranged to conduct articles disposed therein toward the outlet, the dividing means including a plurality of upstanding lane dividers coupled to the hopper and arranged in spaced apart relation to define the plurality of article-receiving lanes, and
means for disengaging an article riding on the dividing means from the dividing means as the article is conveyed in the predetermined direction to cause the article to fall into a single article-receiving land and assume a predetermined orientation therein prior to discharge of the article from the hopper through the outlet, the disengaging means including a plurality of barriers coupled to the lane dividers and each barrier includes ramp means for retarding movement of a portion of an article riding on the lane divider as the article is conveyed in the predetermined direction toward the outlet so that such articles are rotated in the hopper and deposited into a single article-receiving lane to assume said predetermined orientation therein prior to discharge from the hopper through the outlet, the disengaging means further including means for coupling the barrier to the lane divider to orient the ramp means to establish an article-camming inclined plane sloping upwardly in the predetermined direction toward the outlet, the coupling means including adjustment means for varying the upward slope of the article-camming inclined plane established by the ramp means.

6. A vibratory conveyor apparatus for conveying and orienting articles, the apparatus comprising
a hopper having an inlet and an outlet, the hopper including a floor,
means for vibrating the hopper to convey articles disposed in the hopper in a predetermined direction toward the outlet,
means for dividing the hopper into a plurality of article-receiving lanes arranged to conduct articles disposed therein from the inlet toward the outlet, the dividing means including a plurality of lane dividers coupled to the floor and arranged in a spaced-apart relation to define an article-receiving lane between each pair of side-by-side lane dividers, and
means for retarding movement of a portion of articles riding on the dividing means as the articles are conveyed in said predetermined direction to change the orientation of said articles relative to the hopper and to deposit said articles in one of said article-receiving lanes prior to discharging said articles through the outlet, the retarding means including a ramp appended to at least one of the lane dividers and positioned to engage the portion of an article moving through the hopper and riding on a top edge of a lane divider, the ramp including an article-camming surface inclined at an acute angle relative to the floor of the hopper and arranged to diverge from the floor in said predetermined direction, the retarding means further including means for adjustably coupling each ramp to a lane divider so that the acute angle at which the article-camming surface is positioned relative to the floor is adjustable.

7. The apparatus of claim 6, further comprising a bin coupled to the inlet of the hopper for receiving a plurality of randomly positioned articles therein, means for coupling the bin to the vibrating means so that articles deposited in the bin are conveyed to the inlet of the hopper, and means for unstacking articles being conveyed toward the inlet of the hopper in the bin so that articles are arranged in a random formation a single layer deep as they enter the inlet of the hopper.

8. The apparatus of claim 7, wherein the bin includes a transporting surface for transporting articles from the bin to the inlet of the hopper and the unstacking means includes a striker plate positioned over the transporting surface to permit only a single layer of articles to enter the inlet of the hopper.

9. A vibratory conveyor apparatus for conveying and orienting articles having a predetermined height, a predetermined width, and a predetermined depth, the apparatus comprising
a hopper having an inlet for receiving articles and an outlet for discharging articles from the hopper,
means for vibrating the hopper to convey articles disposed in the hopper in a predetermined direction toward the discharge outlet,
means for dividing the hopper into at least one article receiving lane having a width larger than the predetermined width of the articles and smaller than the predetermined height of the articles so that the articles are conveyed in the at least one article receiving lane in a single predetermined orientation relative to the hopper, and means for camming the articles as the articles are conveyed through the hopper in the predetermined direction toward the outlet so that the articles are rotated and urged to fall into a single article-receiving lane to assume a predetermined orientation therein relative to the hopper prior to discharge of the articles from the hopper through the outlet, the camming means including a plurality of barriers coupled to the dividing means, each barrier including ramp means for retarding movement of a portion of an article riding on the dividing means as the article is conveyed in the predetermined direction toward the outlet so that such articles are disengaged from the dividing means and are deposited into a single article-receiving lane to assume said predetermined orientation therein prior to discharge from the hopper through the outlet, the camming means further including means for coupling the barriers to the dividing means to orient the ramp means to establish an article-camming inclined plane sloping upwardly in the predetermined direction toward the outlet, the coupling means including adjustment means for varying the upward slope of the article-camming inclined plane established by the ramp means.

10. The apparatus of claim 9, further comprising a bin coupled to the inlet of the hopper for receiving a plurality of articles therein, means for coupling the bin to the vibrating means so that articles deposited in the bin are conveyed to the inlet of the hopper, and means for unstacking articles being conveyed toward the inlet of the hopper in the bin so that the articles are arranged in a random formation a single layer deep as they enter the inlet of the hopper.

11. The apparatus of claim 10, wherein the bin includes a transporting surface for transporting articles from the bin to the inlet of the hopper and the unstacking means includes a striker plate positioned over the transporting surface to permit only a single layer of articles to enter the inlet of the hopper.

12. A hopper for transporting a stream of moving articles in a predetermined direction, the hopper comprising
an inlet,
an outlet,
a floor,
means coupled to the floor for dividing the hopper into a plurality or article-receiving lanes arranged to conduct articles disposed therein from the inlet toward the outlet, the dividing means including a plurality of upstanding lane dividers coupled to the floor of the hopper and arranged in a spaced-apart, substantially parallel relation to define an article-receiving lane between each pair of side-by-side lane dividers, and
means coupled to the dividing means for camming articles riding on the dividing means to rotate the articles riding on the dividing means as said articles move in said predetermined direction to disengage said articles from the dividing means so that said articles are deposited in a single article-receiving lane prior to discharge of said articles from the outlet, the camming means including a barrier having a ramp and means for mounting the barrier on a lane divider so that the ramp is inclined to slope upwardly relative to the floor to engage a portion of said articles riding on the lane dividers and retard movement of said portion in the predetermined direction as said articles moves further toward the outlet, thereby causing said portion to disengage the lane divider so that said articles fall into the article-receiving lane in the predetermined orientation, the mounting means including means for selectively adjusting the angle of incline of the ramp relative to the floor.

13. The apparatus of claim 12, further comprising a bin coupled to the inlet of the hopper for receiving a plurality of randomly positioned articles therein, means coupled to the bin for vibrating the bin means so that articles deposited in the bin are conveyed to the inlet of the hopper, and means for unstacking articles being conveyed toward the inlet of the hopper in the bin so that articles are arranged in a random formation a single layer deep as they enter the inlet of the hopper.

14. The apparatus of claim 13, wherein the bin includes a transporting surface for transporting articles from the bin to the inlet of the hopper and the unstacking means includes a striker plate positioned over the transporting surface to permit only a single layer of articles to enter the inlet of the hopper.

15. A hopper for transporting a stream of moving articles in a predetermined direction, the hopper comprising
an inlet,
an outlet,
a floor,
first and second spaced apart side walls, the first and second side walls being coupled to the floor to define a width boundary of the hopper,
means coupled to the floor for dividing the hopper into a plurality of article-receiving lanes arranged to conduct articles disposed therein from the inlet toward the outlet, the dividing means being situated between the first and second side walls to define the article-receiving lanes therebetween,
means coupled to the dividing means for camming articles riding on the dividing means to rotate the articles riding on the dividing means as said articles move in said predetermined direction to disengage said articles from the dividing means so that said articles are deposited in a single article-receiving lane prior to discharge of said articles from the outlet, and
means couple to the first and second side walls for changing the position of articles leaning against the side walls, the changing means being configured to move articles away from the side walls so that the articles ride on the dividing means adjacent to the first and second side walls, the changing means including first and second blocking members and means for mounting the first and second blocking members to the first and second side walls, respectively, so that the first and second blocking members lie in a plane orthogonal to the side walls within article-receiving lanes adjacent the first and second side walls, respectively.

16. The apparatus of claim 15, wherein the blocking members each include a ramp surface having a positive slope relative to the first and second side walls in the predetermined direction.

17. A hopper for transporting a stream of moving articles in a predetermined direction, the hopper comprising
an inlet,
an outlet,
a floor, means coupled to the floor for dividing the hopper into a plurality of article-receiving lanes arranged to conduct articles disposed therein from the inlet toward the outlet, the dividing means including a plurality of lane dividers coupled to the floor and arranged in a spaced-apart relation to define an article-receiving lane between each pair of side-by-side lane dividers, and means coupled to the dividing means for camming articles riding on the dividing means to rotate the articles riding on the dividing means as said articles move in said predetermined direction to disengage said articles from the dividing means so that said articles are deposited in a single article-receiving lane prior to discharge of said articles from the outlet, the camming means including a ramp appended to at least one of the lane dividers and positioned to engage the portion of an article moving through the hopper and riding on a top edge of a lane divider, the ramp including an article-camming surface inclined at an acute angle relative to the floor of the hopper and arranged to diverge from the floor in said predetermined direction, the camming means further including means for adjustably coupling each ramp to a lane divider so that the acute angle at which the article-camming surface is positioned relative to the floor is adjustable.

* * * * *